(No Model.)
C. E. MORTON.
CULTIVATOR.
No. 390,506. Patented Oct. 2, 1888.
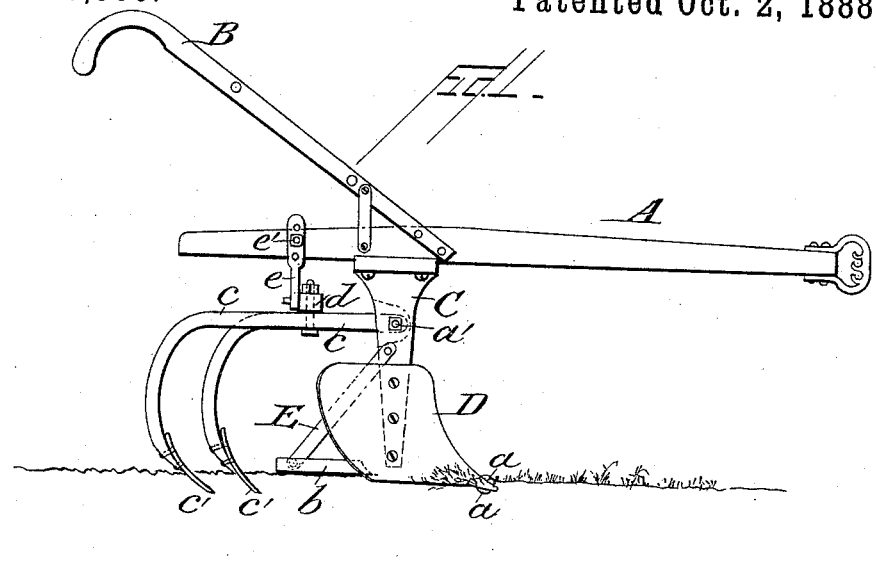
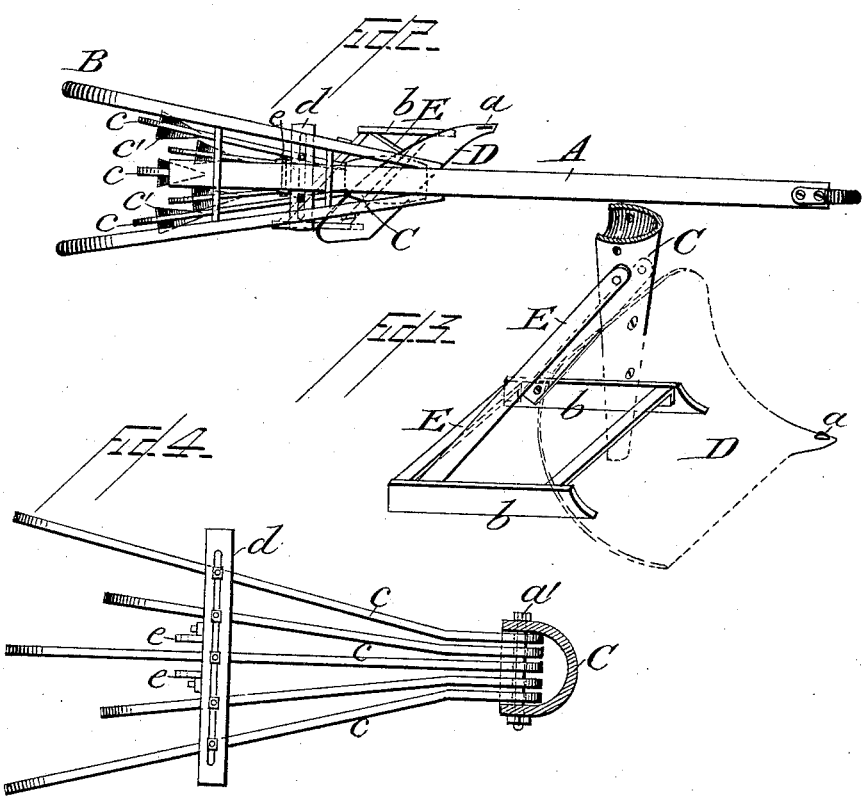
Witnesses
F. H. Schott
W. E. Chandler
Inventor
Charles E. Morton
By his Attorney
W. C. Langan

UNITED STATES PATENT OFFICE.

CHARLES EVERETT MORTON, OF MADISONVILLE, KENTUCKY.

CULTIVATOR.

SPECIFICATION forming part of Letters Patent No. 390,506, dated October 2, 1888.

Application filed April 27, 1888. Serial No. 272,069. (No model.)

*To all whom it may concern:*

Be it known that I, CHARLES EVERETT MORTON, of Madisonville, in the county of Hopkins, State of Kentucky, have invented certain new and useful Improvements in Cultivators, whereof the following is a full and complete description.

This invention relates to improvements in that class of implements used in clearing ground of weeds between rows of corn, cotton, or other crops planted in rows, and also to stir up and cultivate such ground when desired, the object being to produce an implement that may be used as a scraper alone for the purpose of removing weeds, or by the use, in addition thereto, of a series of adjustable cultivator-teeth may be made not only to clear the ground of weeds, but to stir up the soil to any desired depth.

In carrying out this invention a beam provided with handles like those of a plow has attached to its under side by means of a suitable standard a curved steel or iron plate set diagonally to the beam and provided at its forward end with a point similar in some respects to that of a plow. Attached to the rear of the scraper is a frame provided with runners, which rest upon the surface of the ground and gage the position with relation to said surface of the lower cutting-edge of the scraper. Pivoted to the standard in the rear of the scraper is a series of bars, preferably five in number, each of which bars is bent downward at its rear end and furnished with a cultivator or triangular plate of metal, which, as the implement is drawn forward, enters the earth to a greater or less depth, as may be required. A cross-piece upon the top of these cultivator-bars, and to which they are also attached, furnishes a means for adjustment by which they can be brought closer together or separated, so as to cultivate a strip of ground of greater or less width, as may be required by the distance apart of the rows between which the implement is used.

In the accompanying drawings, which illustrate this invention, Figure 1 is a side elevation of the implement complete. Fig. 2 is a plan of the same, showing the relative positions of the different parts. Fig. 3 is a detail showing the construction of the runners and their supporting-frame. Fig. 4 is an enlarged plan of the cultivator-bars, illustrating details of construction.

In the several figures, A represents the beam, provided at its front end with a suitable clevis or other means for attaching the team.

B B' are the handles, firmly connected to the beam by bolts and braces.

C is a standard bolted or otherwise securely attached to the under side of the beam, and carrying the scraper D. This scraper is preferably formed from a curved plate of steel, its lower edge sharp to cut the weeds with which it comes in contact, and is secured to the standard in such a position that its face shall be diagonal to the line of draft, similar to the mold-board of a plow, so that the weeds cut by it will be thrown to one side. The forwardly-projecting corner of the scraper is provided with a point projecting a short distance forward, and having semicircular cutting-blades $a$ projecting both upward and downward therefrom. In the rear of this scraper, and attached to the standard, is a frame, E, which carries the runners $b\ b$. These runners rest upon the surface of the ground back of the scraper and prevent it from going too deep, causing it to advance just sufficiently beneath the surface to cut the grass and weeds at that point, which is generally found to insure their destruction.

The cultivator arms or bars $c\ c$ are hinged to a bolt, $a'$, which passes through a socket in the standard C, formed for the reception of the ends of said bars. The holes in the bars through which the bolt $a'$ passes are made large, so that they may have not only an up-and-down swinging movement on the bolt, but may also be moved sidewise within certain limits to vary the width of the cultivator. The bars $c$ are bent downward at their rear ends, and to their lower extremities is secured the triangular tooth or blade $c'$. The form of this tooth may be varied to suit the different work or soil in which the implement is to be used. In some instances a flat plate will be found best, and in others it may be curved to resemble somewhat in shape a double-moldboard plow. I prefer to use five of these cultivator-bars, the central and two outer bars being longer than the other two, so that their points will be in two rows one in advance of the other.

A cross-bar, $d$, is placed above and adjacent to the cultivator-bars and to which bars it is secured by clamp-screws, as shown in Fig. 1. These clamp-screws and cross-bar form the means by which the cultivator-bars are retained in position laterally, while their vertical position with relation to the scraper and its shoes is maintained by the vertical bars $e$, attached to the cross-bar and secured to the beam at a point in rear of the handles by a bolt, $e'$, passing through said beam and one in a series of holes formed in the vertical bars.

It will be apparent that the whole forms an implement of varied and extensive use in the cultivation of such crops as are planted in rows.

Having thus described my invention, I claim as new, and desire to secure by Letters Patent, the following:

1. In a cultivator, the combination, with the scraper, the adjustable frame, and its shoes, of the pivoted and adjustable series of cultivator-teeth, arranged in the rear of the scraper and adapted to operate jointly therewith in clearing the ground and stirring the same, as specified.

2. As an improvement in implements for clearing the ground of weeds and grass between rows of plants, the combination, with the beam A, handles B, and standard C, of the scraper D, adjustable frame E, runners or shoes $b$, and vertically as well as horizontally adjustable cutting-bars $c$, all arranged and operated substantially as shown and described.

In testimony whereof I hereunto affix my signature in the presence of two witnesses.

CHARLES EVERETT MORTON.

Witnesses:
W. H. HOFFMAN,
S. F. BROWN.